(12) United States Patent
Morency et al.

(10) Patent No.: US 11,840,411 B2
(45) Date of Patent: *Dec. 12, 2023

(54) VISION-ASSISTED ROBOTIZED DEPALLETIZER

(71) Applicant: SYMBOTIC CANADA ULC, Montreal (CA)

(72) Inventors: Sylvain-Paul Morency, Montreal (CA); Marc Ducharme, Montreal (CA); Robert Jodoin, Montreal (CA); Philippe Hakier, Montreal (CA); Christian Simon, Montreal (CA); Jean-François Forget, Montreal (CA)

(73) Assignee: SYMBOTIC CANADA ULC

( * ) Notice: Subject to any disclaimer, the term of this patent is extended or adjusted under 35 U.S.C. 154(b) by 0 days.

This patent is subject to a terminal disclaimer.

(21) Appl. No.: 17/806,864

(22) Filed: Jun. 14, 2022

(65) Prior Publication Data

US 2022/0306407 A1 Sep. 29, 2022

Related U.S. Application Data

(63) Continuation of application No. 17/235,692, filed on Apr. 20, 2021, now Pat. No. 11,358,811, which is a continuation of application No. 16/506,636, filed on Jul. 9, 2019, now Pat. No. 10,981,736, which is a continuation of application No. 14/602,537, filed on Jan. 22, 2015, now Pat. No. 10,343,857.

(Continued)

(51) Int. Cl.
*B65G 61/00* (2006.01)
*B65G 59/02* (2006.01)

(52) U.S. Cl.
CPC ............ *B65G 61/00* (2013.01); *B65G 59/02* (2013.01)

(58) Field of Classification Search
CPC ................................ B65G 61/00; B65G 59/02
See application file for complete search history.

(56) References Cited

U.S. PATENT DOCUMENTS

| | | |
|---|---|---|
| 5,007,785 A | 4/1991 | Van Der Schoot |
| 5,082,326 A | 1/1992 | Sekido et al. |

(Continued)

FOREIGN PATENT DOCUMENTS

| | | |
|---|---|---|
| CA | 2807595 | 5/2013 |
| EP | 0911603 | 4/1999 |

(Continued)

*Primary Examiner* — Patrick J Maestri
(74) *Attorney, Agent, or Firm* — Perman & Green, LLP (57) ABSTRACT

A vision-assisted robotized depalletizer receives at a pallet station a pallet loaded with products and outputs on a conveyor unitized products aligned in a desired orientation. Such depalletizers include a vision system having one or more image acquisition sensors that are positioned relative to the pallet station so as to have a field of view covering a top portion of the pallet. The sensors send to a controller one or more image of the top portion of the pallet that the controller uses along to determine the position of each product in the top portion of the pallet. The depalletizer further includes a robot equipped with a depalletizing tool that is coupled to the vision system controller for receiving information indicative of the position of each product from the top portion and uses that information to pick and position on the output conveyor each product from the top portion.

26 Claims, 4 Drawing Sheets

Related U.S. Application Data

(60) Provisional application No. 61/930,107, filed on Jan. 22, 2014.

(56) References Cited

U.S. PATENT DOCUMENTS

| | | |
|---|---|---|
| 6,332,750 B1 | 12/2001 | Donner et al. |
| 6,989,497 B1 | 1/2006 | Lee |
| 8,248,620 B2 | 8/2012 | Wicks et al. |
| 8,315,739 B2 | 11/2012 | Dai |
| 10,343,857 B2 | 7/2019 | Morency et al. |
| 2007/0099031 A1 | 5/2007 | Chung et al. |
| 2007/0248448 A1 | 10/2007 | Starz |
| 2009/0266676 A1 | 10/2009 | Eschlbeck et al. |
| 2012/0330453 A1 | 12/2012 | Samak Sangari et al. |
| 2013/0017053 A1 | 1/2013 | Forget et al. |
| 2013/0302126 A1 | 11/2013 | Schaller et al. |
| 2014/0205403 A1 | 7/2014 | Criswell |
| 2015/0038072 A1 | 2/2015 | Cordier et al. |

FOREIGN PATENT DOCUMENTS

| | | |
|---|---|---|
| GB | 2511915 | 9/2014 |
| WO | 2006117814 | 11/2006 |

VISION-ASSISTED ROBOTIZED DEPALLETIZER

CROSS-REFERENCE TO RELATED APPLICATIONS

This application is a continuation of U.S. Non-Provisional application Ser. No. 17/235,692, filed Apr. 20, 2021, (now U.S. Pat. No. 11,358,811), which is a continuation of U.S. application Ser. No. 16/506,636, filed Jul. 9, 2019, (now U.S. Pat. No. 10,981,736), which is a continuation of U.S. application Ser. No. 14/602,537, filed Jan. 22, 2015, (now U.S. Pat. No. 10,343,857), which claims the benefit of U.S. Provisional Application No. 61/930,107, filed on Jan. 22, 2014, the disclosures of which are incorporated herein by reference in their entireties.

FIELD

The present disclosure relates to depalletizing, and more specifically to vision-assisted robotized depalletizing of products.

BACKGROUND

Distribution centers and warehouses typically receive their products such as cases, boxes, open trays, stretch wrapped trays, etc. on a structured pallet, e.g. orderly positioned without gaps between them. Depalletizing systems are known in the art to remove the products from the pallet.

Technologies known as "bulk depalletizers" are used to remove a complete layer of products by pushing them from the pallet to an outfeed conveyor. In this situation, each layer of product is typically separated with a slip sheet.

Sometimes the products need to be depalletized and singulated so they can be stored in an automatic storage and retrieval system. There are usually two approaches to do this. The first is manual depalletizing, where operators pick the products individually and forward them on an outfeed conveyor. The other approach is to use a robot arm equipped with a layer depalletizing tool to remove the products layer by layer and drop them on an outfeed conveyor. Products are singulated after being depalletized in order to being stored in an automatic storage and retrieval system.

Robotized layer depalletizing tools are quite efficient when a large amount of products are found on each layer (small to medium sized products). Because of the complexity of the tool and the weight of the load, the cycle time is long and the efficiency (products per minute) drops when the products are large. In this later case, picking products one by one becomes a better approach. Also, with this approach, the products do not have to be singulated downstream as products are picked one by one from the pallet. This yields that the complete footprint is reduced compared to the approach that includes the layer depalletizer coupled with a singulator.

U.S. Pat. No. 8,248,620 B2, issued on Aug. 21, 2012 to Wicks and Maue and being titled "Object Detection Device" describes an object detecting device for detecting the existence and general placement of an object residing upon a surface. It uses a laser measuring scanner disposed on a linear actuator to allow the depalletizer to properly center a depalletizer tool in relation to the top layer to be picked from the load.

The device from Wicks and Maue uses a vision system to detect the top layer position only (e.g. outside corners of the top layer) and is unable to locate and position individual products on the layer.

U.S. Pat. No. 8,315,739 B2, issued on Nov. 20, 2012 to Dai and being titled "Determining the Position of an Object" describes a method for determining the position of at least one object present within a working range of a robot wherein an image is generated during a motion of the camera mounted on a robot.

The method from Dai is directed to known objects that are randomly stacked in a container, and does not allow to identify boxes that are adjacent to each other. Indeed, Dai's method looks for pieces with known dimensions that are distanced from each other and would not be operable when looking for products with no gaps therebetween. Also, in Dai, the camera is mounted on a robot. This slows down the process considering that the robot has to stop moving to take an image and wait for the result of the processing.

U.S. Pat. No. 6,332,750 B1, issued on Dec. 25, 2001 to Donner at al. and being titled "Method and Apparatus for Depalletizing Commodities" describes an apparatus for removing commodities from an upper side of a support, including means for monitoring the position of the support and at least one of the implement (e.g. slip sheet) and the selected commodity. A position sensor is located in the moving mean (e.g. tool).

The apparatus from Donner works by implying that slip sheets are present, which is not always the case. Also, similarly to the system by Dai, the position sensor is located on the tool, which implies immobilizing the tool frequently.

United States Patent Application No. 2014/0205403 A1, issued on Jul. 24, 2014 to Criswell and being titled "Automated Truck Unloader for Unloading/Unpacking Product from Trailers and Containers" describes an apparatus and method for unloading product from a trailer by executing a routine where a protruding product is identified and then unloaded by an industrial robot.

The approach taken by Criswell is based on the presence of a protruding product that can be identified by the vision system and therefore is inapplicable for depalletizing pallets where there are no protruding products when a complete layer is presented at the cell.

European Patent No. 0 911 603 B1, issued on Oct. 22, 1997 to Ersü and being titled "Method for the Determination of the Position of a Three-Dimensional Body" describes a method for the optical determination of the position of a finite rigid body where a selection of at least three lines of edges provided on the rigid body are identified.

The method from Ersü is applicable when the product to be positioned is already singulated from other products and as such cannot be used for products that need to be depalletized.

The PCT Patent Application Publication No. WO 2006117814 A1, published on Nov. 9, 2006 to Lodi Rizzini and being titled "Automatic Depalletizer" describes an apparatus and a method for depalletizing a pallet of blocks of material, where an optic sensor detects the distribution of the blocks located on the pallet before the blocks are picked and conveyed to the unloading station.

The depalletizer by Lodi Rizzini is aimed at depalletizing blocks of materials and is not suitable to depalletizing a wide variety of products such as boxes, cases, trays, etc. The optic sensor described by Rizzini is not versatile enough to detect and localize a wider variety of products, for example of any color and of variable rectangular shape.

A robotic system that allows depalletizing products as various as cases, boxes, trays and the like that are orderly positioned on a pallet with or without gaps between the products is thus desirable.

SUMMARY

According to an illustrated embodiment, there is provided a depalletizer comprising:
a pallet unloading station for receiving a pallet of products;
a vision system for taking at least one image of a top portion of the pallet received at the pallet station, and for using said at least one image for determining the position of said each product in the top portion of the pallet; and
a robot equipped with a depalletizing tool; the robot being coupled to the vision system for receiving information therefrom indicative of the position of said each product from the top portion and for using that information to pick and position on an output surface said each product from the top portion.

According to another illustrative embodiment, there is provided a depalletizer comprising:
a vision system including at least one image acquisition sensor for taking an image of a top portion of a pallet positioned under the at least one image acquisition system, and a vision system controller coupled to the at least one image acquisition sensor for receiving the image and for using said image to determine the position of each product in the top portion of the pallet; and
a robot equipped with a depalletizing tool including at least one suction means; the robot being coupled to the vision system controller for receiving information therefrom indicative of the position of each product from the top portion and for using that information to pick and position on an output conveyor said each product from the top portion.

According to still another embodiment, there is provided a method for depalletizing a pallet of products, the method comprising:
taking an image of a top portion of the pallet;
the controller using the image to determine a position of a product to pick from the top portion of the pallet;
the controller sending to a robot information indicative of the position of the product to pick on the pallet; and
the robot picking the product and moving the product on an output surface.

Considering the growing needs of warehouses and distribution centers for automation, it is believed that there is a need for a vision-assisted robotized depalletizer as described herein.

The term "image" should be construed in the description and in the claims as including without limitations a color or a gray intensity or depth map.

Other objects, advantages and features of vision-assisted robotized depalletizer will become more apparent upon reading the following non restrictive description of illustrated embodiments thereof, given by way of example only with reference to the accompanying drawings.

DETAILED DESCRIPTION

In the following description, similar features in the drawings have been given similar reference numerals, and in order not to weigh down the figures, some elements are not referred to in some figures if they were already identified in a precedent figure.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements.

A vision-assisted robotized depalletizer 10 according to an illustrative embodiment will now be described with reference to FIG. 1.

The vision-assisted robotized depalletizer 10 comprises a pallet unloading station 12 for receiving a pallet 14 of products 16, a vision system 18 for taking an image (not shown) of the top portion 20 of the pallet 14, a robot arm 22 equipped with a depalletizing tool 24 for picking the products 16 one by one and for positioning the products 16 on an output conveyor 26.

The expression "top portion of the pallet" should be construed in the description and in the claims as a portion of the pallet that includes top surfaces of products located in the pallet that are visible from above the pallet.

As an input, the depalletizer 10 receives a pallet 14 of products 16.

The robot arm 22 guided by the vision system 18 depalletizes the products 16 one by one and transfers them on the output conveyor 26 in a predetermined manner, yielding a flow of unitized products 16 aligned in a desired orientation on the output conveyor 26.

The expression "product" should be construed in the description and in the claims as including any type of consumer goods in any type of packaging, such as, without limitations, closed cartons, totes, open top cartons, trays with or without shrink wrapped film, bags and pouches, etc.

The product dimensions may vary greatly between each different type of product. Typical dimensions (W×L×H) are between 10.2 cm×15.2 cm×5.1 cm (4"×6"×2") and 63.5 cm×63.5 cm×132 cm (25"×25"×52").

Also, typically, there are no substantial gaps between the products 16 when placed on the incoming pallet 14. It is to be noted however, that a pallet that includes gaps between products can also be provided as an input to the depalletizer 10 and processed thereby.

The pallet 14 loaded with products 16 overall dimensions also vary significantly. The typical size of a loaded pallet 14 is (W×L×H) is 102 cm×122 cm×183 cm (40"×48"×72") but can vary from 82 cm×102 cm×122 cm (32"×40"×48") to 112 cm×132 cm×244 cm (44"×52"×96").

The pallet 14 to be depalletized is received at the pallet unloading station 12. According to the illustrated embodiment, the pallet unloading station 12 is the infeed end 28 of a pallet conveyor 30.

The loaded pallet 14 is first deposited on a feeding conveyor 32 by an external system, such as a fork lift (not shown) or another conveyor. When the pallet unloading station 12 is empty, the feeding conveyor 32 moves another loaded pallet 14 to the pallet unloading station 12 (see arrow 34).

After all products 16 have been depalletized, the empty pallet 33 is moved by the conveyor 30 at its outfeed end 36. The empty pallet 33 is removed using a fork lift (not shown), a conveyor (not shown), or any other means to transport a pallet.

According to another embodiment (not shown), the unloading pallet station includes a pallet elevator that lifts the pallet as it is getting depalettized.

According to still another embodiment (not shown), one or both of the conveyors 30 and 32 is/are omitted and the pallet unloading station 12 is in the form of a table that receives the loaded pallet 14 directly from a fork lift. According to such an embodiment, the empty pallet 33 is removed from the table similarly.

Since conveyors and fork lift are believed to be well known in the art, they will not be described herein in more detail for concision purposes.

The vision system 18 includes one or more image acquisition sensors 19 that are so positioned relative to the pallet unloading station 12 so as to have a field of view 38 covering the top portion 20 of the loaded pallet 14 at the pallet unloading station 12.

The sensors 19 are not limited to be positioned above the loaded pallet 14 and, alternatively or additionally, one or more additional image acquisition sensors (not shown) can be positioned for example diagonally of the pallet unloading station 12 yielding a field of view including at least part of one side of the loaded pallet 14.

The sensor 19 allows acquiring sufficient data to reconstruct an image of the top 20 of the loaded pallet 14 and/or a three-dimension 3D model thereof. Conventional industrial gray tone or color cameras and/or laser triangulation scanners, structured light, stereoscopy or "time-of-flight camera" such as Microsoft Kinect® sensors can be used.

Since such conventional cameras and time-of-flight type sensors are believed to be well known in the art, they will not be described herein in more detail for concision purposes.

The vision system 18 further includes a controller 40 that is wired to the sensors 19 or wirelessly coupled thereto and both are configured for the transfer of acquired image data between the sensors 19 and the controller 40.

The controller 40 processes the received image data of the top portion of the pallet 14 and at least one characteristic of the products, such as their theoretical or measured dimensions (length, width and height), expected container types, and/or any other characteristic that may impact the vision processing to determine the position of each product 16 in the top portion of the pallet 14.

The product characteristics used by the controller 40 are predetermined and inputted therein by a user or received thereby from a remote computer or controller (both not shown). More specifically, product descriptions, characteristics and information thereabout can be stored in a database to be transferred through network communication to the controller 40 at time of entrance of the pallet 14.

The controller 40 is configured or programmed for combining and analyzing the information acquired by the image acquisition sensors 19 and the predetermined characteristics of the products 16 to detect the products' position relative to the robot 22. The following are non limitative examples of characteristics that are analyzed from the image by the controller 40: edges of the products 16, corners of the products 16, and pattern repetition of the products 16. These characteristics are obtained on the image for example by depth or intensity variations thereon. The controller 40 then determines and sends to the robot controller (not shown) data indicative of the position and size of the next product 16 to pick.

The position of the product to pick is referenced to the same point of origin in the working space of both the controller 40 and the robot 22.

In some embodiment, the controller 40 and the robot controller are the same.

The expression "controller" should be construed broadly as including one or more electronic devices, including for example one or more computers that are configured with components and/or programmed with instructions that produce one or more functionalities.

The robot 22 is in the form of a standard four (4) or six (6) axis industrial articulated robot arm and is equipped with a standard or custom designed end of arm tool 24 capable to securely pick and transfer the products from the loaded pallet to the output conveyor is used. A conventional robot arm can be used, such as ABB™'s IRB 660 or IRB 6640, FANUC™'s R2000 or M410, or any similar robot arm offered by other manufacturers such as Kuka™ or Motoman™.

According to another embodiment (not shown), one or more additional robot arm are used (not shown), for example when there are two output conveyors or more.

The end of arm tool 24 is configured to pick from the loaded pallet 14 a variety of products and product dimensions. According to the illustrated embodiment, the end of arm tool 24 includes suction cups or suction pads 42 that are used on the top and/or side of the product 16 to lift it and a bottom support plate or fingers 44 that can extend underneath the product 16 that is then secured to the tool 24 by the suction cups or pads 42.

According to another embodiment (not shown), the end of arm tool 24 uses only suction cups or suction pads on the upper or side surface of the product 16 to lift and transfer it on the output conveyor 26. According to another embodiment (not shown), the end of arm tool 24 uses two vertical side plates to clamp the products 14.

The output conveyor 26 is in the form of a linear conveyor where the products 16 are placed one by one by the depalletizer system 10. According to another embodiment (not shown), the output conveyor is replaced by an output table or any other means adapted to receive the products, such as without limitations, an automated guided vehicle (AGV). According to still another embodiment (not shown), two output conveyors (or more) or other output means are used.

Figure 4:
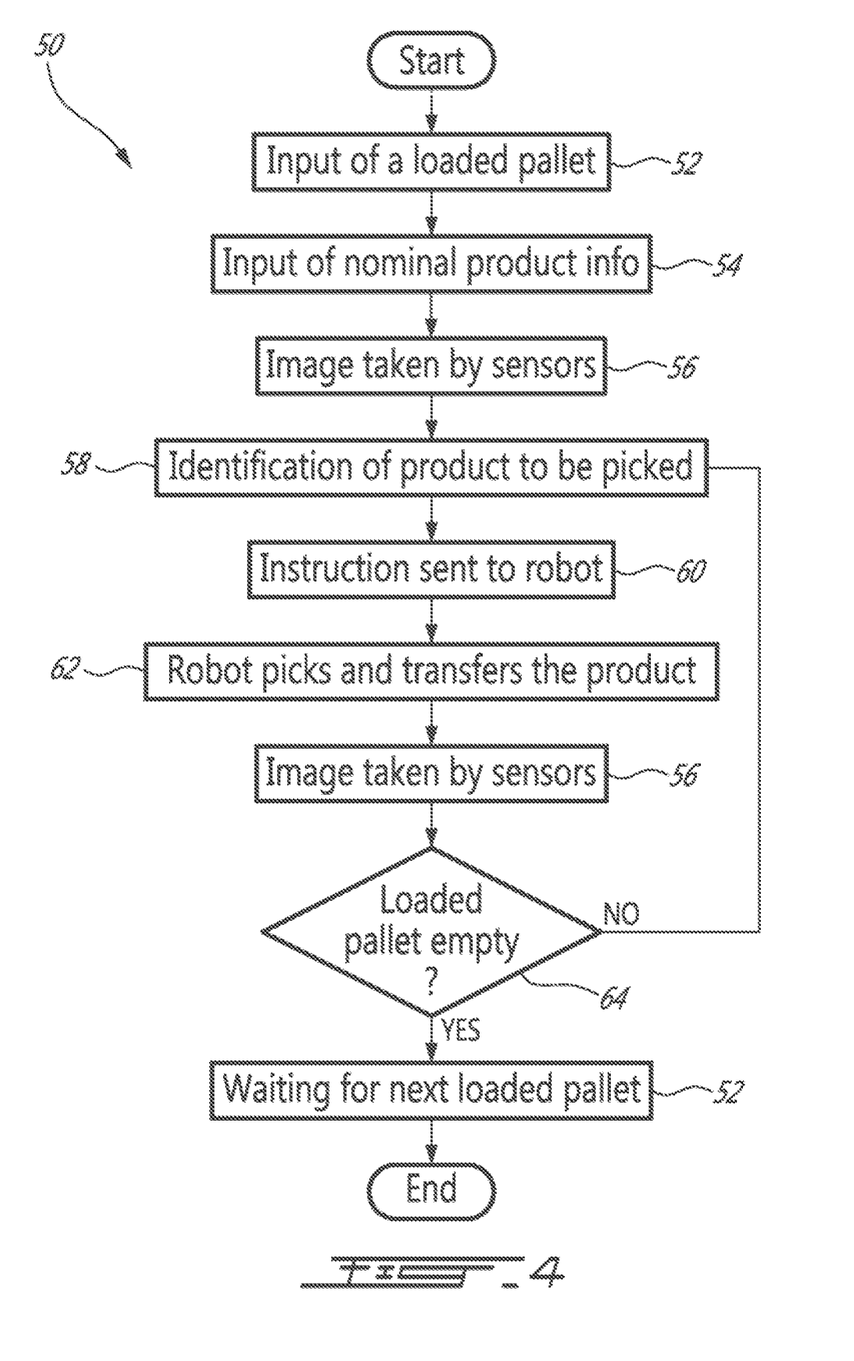
FIG. 4 is a flowchart illustrating an embodiment of a vision-assisted method for depalletizing products on a pallet.

The flow chart 50 shown at FIG. 4 describes an illustrated embodiment of a depalletizing method.

With reference to FIGS. 1 to 4, the operation of the depalletizing system 10 according to the first embodiment will now be described in more detail.

Figure 1:
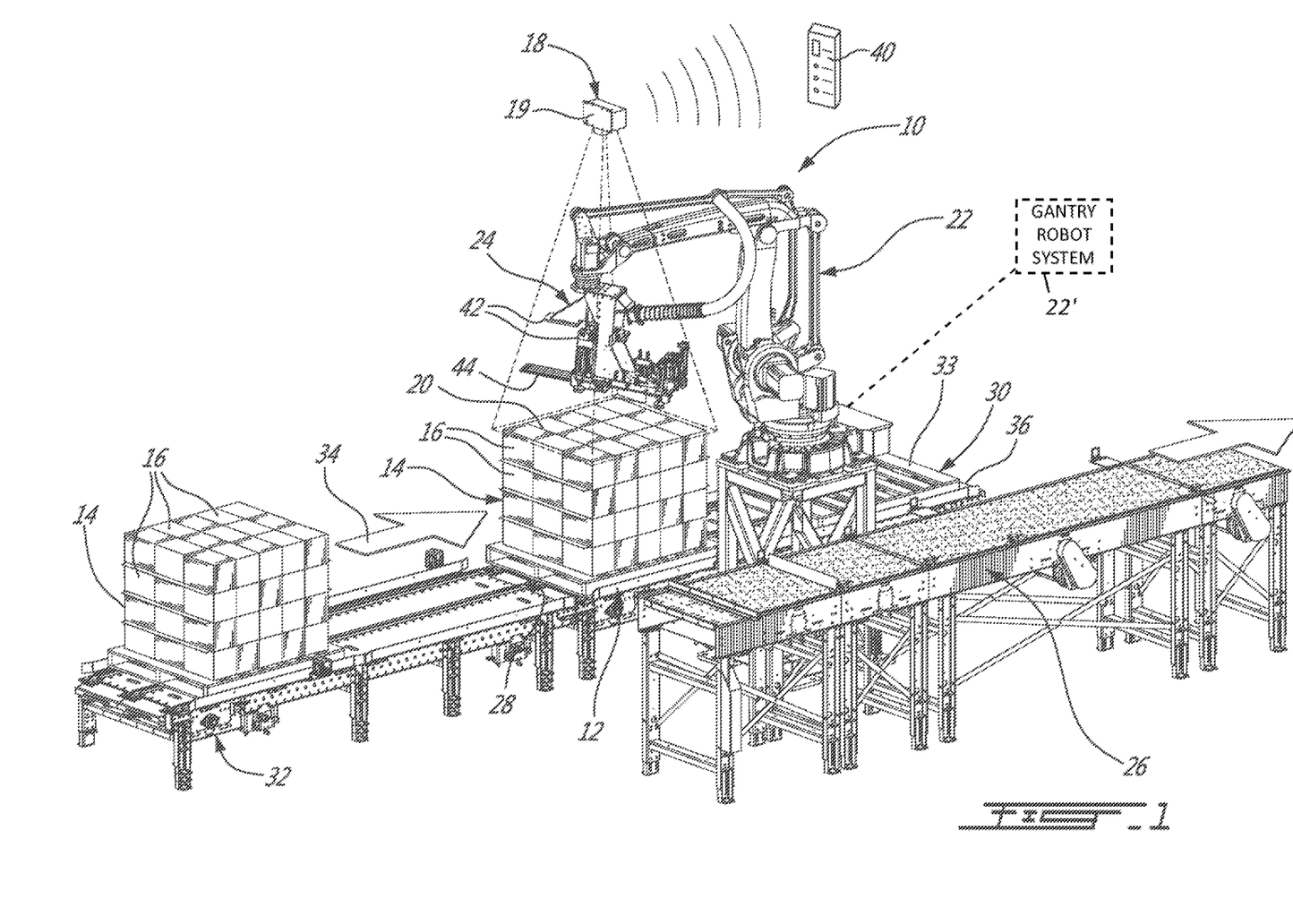
FIG. 1 is a perspective view of a vision-assisted robotized depalletizer according to a first illustrative embodiment; the depalletizer being shown with a full pallet therein.

FIG. 1 shows a loaded pallet 14 being forwarded next to the robot 22 in the loaded pallet station 12 (see arrow 34), ready to be depalletized (step 52). The nominal information about the products 16 on the pallet 14 is inputted to the controller 40 (step 54).

The vision system 18 takes an image of the top portion of the pallet 16 (step 56) and the controller 40 determines the first product 16' to be removed (step 58) and its position. The controller 40 then sends to the robot controller the data indicative of the position and size of the product 16' to pick (step 60).

Figure 2:
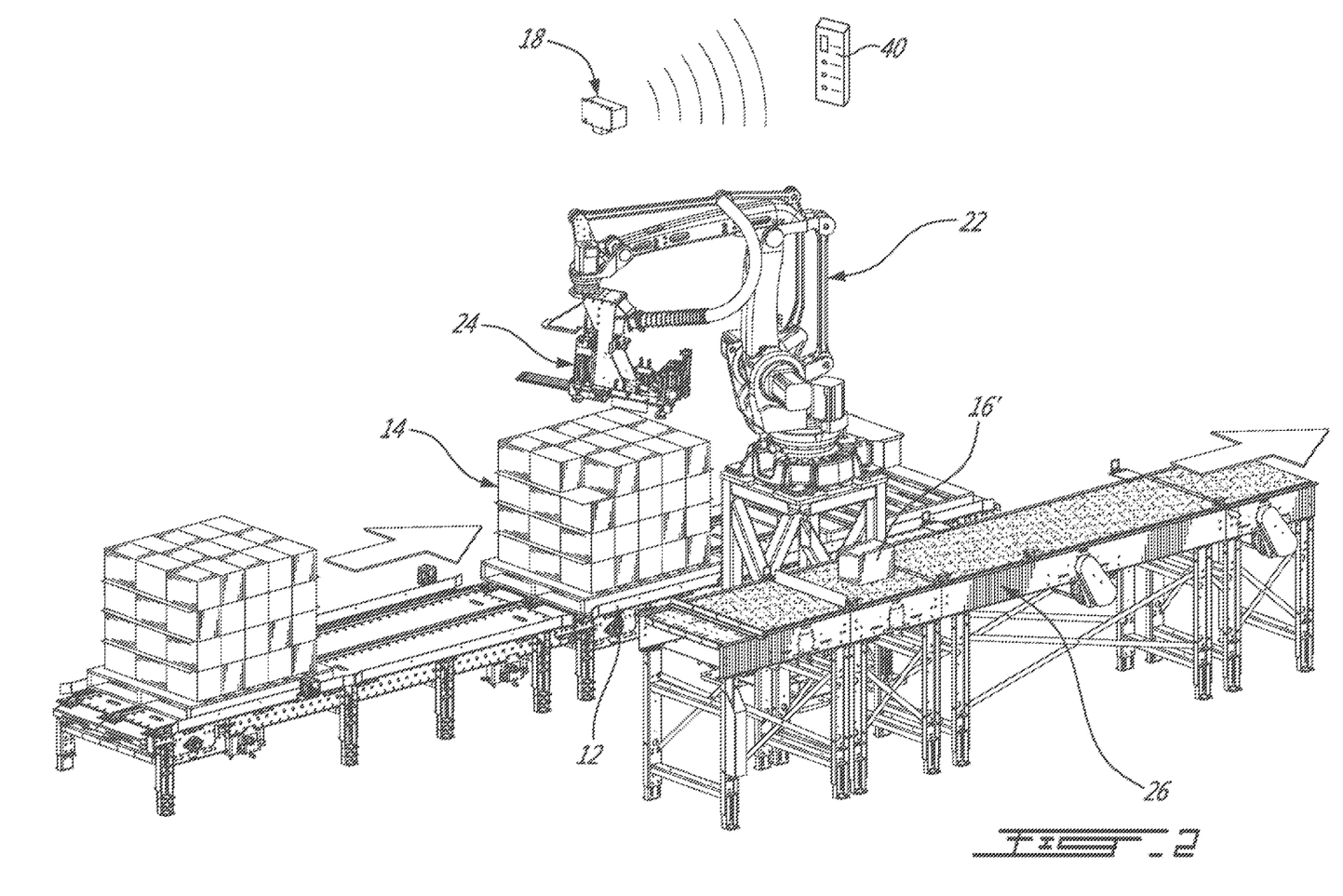
FIG. 2 is a perspective view of the depalletizer from FIG. 1, shown after a first product has been removed from the pallet.

As can be seen in FIG. 2, this first product 16' is transferred on the output conveyor 26 by the robot arm 22 using the end of arm tool 24 (step 62).

The vision system 18 takes a new picture of the top portion of the pallet 14 (step 56) located in the loaded pallet station 12, the controller 40 verifies whether the pallet 14 is empty (step 64) and if the pallet 14 is not empty then the controller 40 identifies the next product 16 to be removed (step 58).

If the pallet 14 is determined to be empty by the controller 40, another pallet 14 is moved at the pallet unloading station 12 while the empty pallet is removed by the conveyor 30 and the method start anew.

Figure 3:
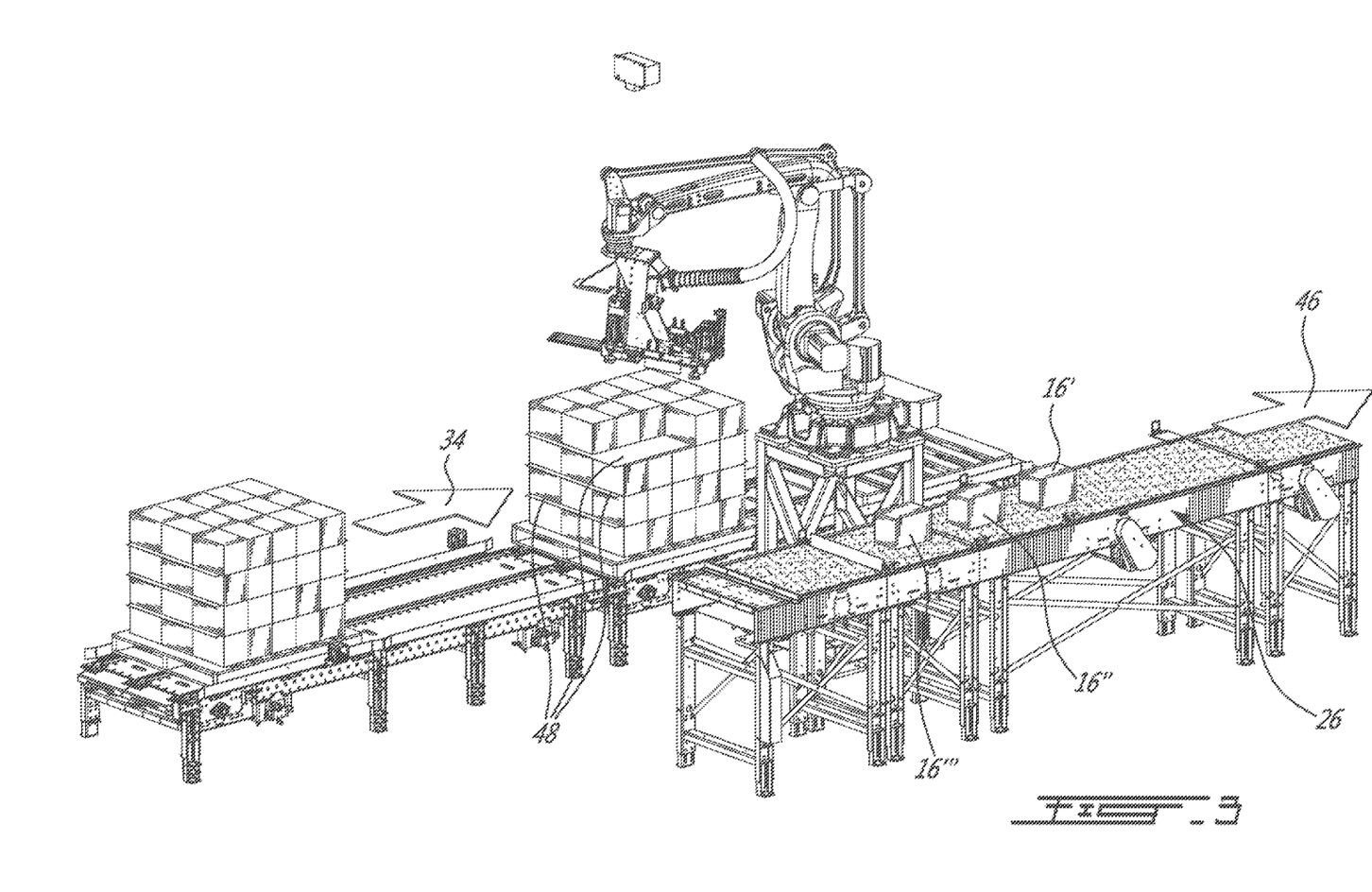
FIG. 3 is a perspective view of the depalletizer from FIG. 1, the depalletizer being shown after the first three products were removed from the pallet.

Turning now to FIG. 3, the second and third products 16" and 16''' are shown transferred by the robot arm 22 and the end of arm tool 24 on the output conveyor 26 and moving towards another station or system (not shown) (arrow 46).

The output conveyor 26 remains in operation while the pallet 14 is depalletized and while a loaded pallet 14 is brought in the pallet unloading station 12 and an empty pallet 30 is removed therefrom by the pallet conveyor 30.

Anyone of the illustrated conveyors 26, 30 and 32 can be of the roller type or of the belt type and can be motorized or not.

While it is not illustrated in FIGS. 1 to 3, a slip sheet removal equipment (not shown) can be used to remove any pallet layer separating (also known as "tier sheet", "separator sheet" and "slip sheet") sheet 48 present in the pallet 14. Such an equipment can be seen as being part of the depalletizer system 10 or not. In some embodiment, the tool 24 can be equipped, for example, of a side suction pad that can be used to remove the slip sheet 48. The vision system determines the presence or absence of a slip sheet.

Since slip sheet removal equipment are believed to be well known in the art, it will not be described herein in more detail for concision purposes.

According to another embodiment, no information about the products 16 to pick is used to the vision system and the vision system 18 determines the position of a product to pick based on the one or more images it takes. Step 54 is then omitted in the method 50.

According to still another embodiment (not shown), one of a plurality of different tools, each adapted for a different type of product, is used by the robot to depalletize the products. According to such an embodiment, each tool can be provided with a tool changer so that the robot can automatically change the tool when needed. The more appropriate end of arm tool 24 to use is based for example on the size and type of the next product to pick.

It is to be noted that many other modifications could be made to the robotized depalletizer described hereinabove and illustrated in the appended drawings. For example:

- the end of arm tooling could include only suction cups, only mechanical means or a combination of both to pick and transfer the products;
- two output conveyors or more could be installed, for example when there is one or two robot arms in the system; and
- the articulated robot arm could be replaced by a gantry type system.

A person skilled in the art will now appreciate that an illustrated embodiment of a depalletizer can be used to depalletize a full or partially full pallet, that includes a same or different types of products.

It is to be understood that illustrative embodiments of the depalletizer are not limited in their application to the details of construction and parts illustrated in the accompanying drawings and described hereinabove. Other embodiments can be foreseen and practiced in various ways. It is also to be understood that the phraseology or terminology used herein is for the purpose of description and not limitation.

What is claimed is:

1. A depalletizer comprising:
a pallet unloading station for receiving a pallet of products;
a vision system for generating at least one image of a top portion of the pallet received at the pallet station, the vision system effecting determination, based on the at least one image, of the position of at least one product in the top portion of the pallet; and
a robot equipped with a depalletizing tool, the robot being configured for receiving information from the vision system indicative of the position of the at least one product from the top portion and being configured to pick and position on an output surface said each product, so as to effect removal of each product from the top portion, based on the received information;
wherein the vision system is configured so as to generate the at least one image of the top portion of the pallet received at the pallet station, where the vision system effects determination, based on the at least one image, of the position of each product in the top portion of the pallet and the robot receives information identifying the determined position of each product, based on the at least one image, so that the robot motion between picks and positions on the output surface of each product in the removal of each product, effected via the robot picks and positions, is substantially independent of generation of the at least one image by the vision system.

2. The depalletizer of claim 1, wherein the vision system includes at least one image acquisition sensor.

3. The depalletizer of claim 2, wherein the vision system includes a vision system controller coupled i) to the at least one image acquisition sensor for receiving the at least one image therefrom and ii) to the robot controller for sending thereto the information indicative of the position of said each product from the top portion.

4. The depalletizer of claim 3, wherein said determining the position of said at least one product is achieved by the controller analysing at least one of the following characteristics from the at least one image: edges of the at least one product seen on the at least one image, corners of the at least one product seen on the at least one image, and pattern repetition of the at least one product seen on the at least one image.

5. The depalletizer of claim 3, wherein said determining the position of said at least one product is achieved by the controller analysing at least one of depth and intensity variations of the at least one image.

6. The depalletizer of claim 3, wherein the vision system controller further uses at least one characteristic of the at least one product, that is determined independent of the at least one image, along with said at least one image in determining the position of said at least one product from the top portion of the pallet.

7. The depalletizer of claim 6, wherein the at least one characteristic of the at least one product includes at least one of i) a dimension of the at least one product and ii) a type of the at least one product.

8. The depalletizer of claim 2, wherein the at least one image acquisition sensor includes at least one of a gray tone camera, a colour camera, a laser triangulation scanner, a structured light type sensor, a stereoscopy sensor, and time-of-flight type sensor.

9. The depalletizer of claim 2, wherein the at least one image acquisition sensor is positioned above the pallet unloading station.

10. The depalletizer of claim 2, wherein the at least one image acquisition sensor includes a plurality of sensors.

11. The depalletizer of claim 1, wherein the output surface is a surface of at least one conveyor.

12. The depalletizer of claim 1, wherein the pallet unloading station is a surface of a conveyor.

13. The depalletizer of claim 1, wherein the products include one of closed cartons, totes, open top cartons, trays bags and pouches.

14. The depalletizer of claim 1, wherein the robot is a four (4) or six (6) axis articulated robot arm.

15. The depalletizer of claim 1, wherein the robot is a gantry-type robot system.

16. The depalletizer of claim 1, wherein the depalletizing tool includes at least one of a suction cup, a suction pad, a support plate and support fingers.

17. The depalletizer of claim 1, wherein the depalletizing tool is part of a series of depalletizing tools, each mountable via a tool changer and being adapted to a specific type of products.

18. The depalletizer of claim 1, wherein the vision system further uses the at least one image for detecting a slip sheet in the pallet; the depalletizer further comprising a slip-sheet removing device coupled to the vision system for removing the slip sheet.

19. The depalletizer of claim 18, wherein the slip-sheet removing device is part of the depalletizing tool.

20. The depalletizer of claim 1, wherein the pallet unloading station includes of a pallet elevator that lifts the pallet of products as it is depalletized.

21. The depalletizer of claim 1, wherein the determined position is decoupled from both robot motion and vision system traverse relative to the top portion of the pallet.

22. A depalletizer comprising:
a vision system including at least one image acquisition sensor for generating an image of a top portion of a pallet positioned under the at least one image acquisition system, and a vision system controller coupled to the at least one image acquisition sensor for receiving the image, the vision system effecting determination, based on the image, of the position of at least one product in the top portion of the pallet; and
a robot equipped with a depalletizing tool including at least one suction means, the robot being configured for receiving information from the vision system indicative of the position of the at least one product from the top portion and being configured to pick and position on an output conveyor said each product, so as to effect removal of each product from the top portion, based on the received information;
wherein the vision system is configured so as to generate the image of the top portion of the pallet positioned under the at least one image acquisition system, and where the vision system effects determination, based on the image, of the position of each product in the top portion of the pallet and the robot receives information identifying the determined position of each product, based on the at least one image, so that the robot motion between picks and positions on the output surface of each product in the removal of each product, effected via the robot picks and positions, is substantially independent of generation of the at least one image by the vision system.

23. The depalletizer of claim 22, wherein the determined position is decoupled from both robot motion and vision system traverse relative to the top portion of the pallet.

24. A method for depalletizing a pallet of products, the method comprising:
generating, with a vision system, an image of a top portion of the pallet;
effecting determination, with a controller, based on the image, of at least one product to pick from the top portion of the pallet;
receiving, with a robot, information indicative of the position of the product to pick on the pallet from the controller; and
moving the robot with respect to the top portion of the pallet and picking, with the robot, the product and moving the product on an output surface so as to effect a removal of each product from the top portion;
wherein generating the image of the top portion of the pallet with the vision system, the robot receives information identifying the determined position of each product, based on the at least one image, so that the robot motion between picks and positions on the output surface of each product in the removal of each product, effected via the robot picks and positions, is substantially independent of generation of the image of the top portion by the vision system.

25. A method as recited in claim 24, further comprising:
inputting in a controller information about the products; and
the controller further using the information about the products along with the image to determine the position of the product to pick from the top portion of the pallet.

26. A method as recited in claim 24, wherein effecting determination, with a controller, based on the image, of a product to pick from the top portion of the pallet is decoupled from both moving the robot and moving the vision traverse with respect to the top portion of the pallet.

* * * * *